Patented Dec. 26, 1939

2,185,080

UNITED STATES PATENT OFFICE 2,185,080

RESINOUS PRODUCT AND METHOD OF MAKING THE SAME

Arthur Haroldson, Newark, Del., assignor to Continental-Diamond Fibre Company, Newark, Del., a corporation of Delaware No Drawing. Application May 8, 1937,
Serial No. 141,553

13 Claims. (Cl. 260—19)

My invention relates to a novel resinous product, and to the method of making it and, more particularly, it relates to a phenolic resin of the type known as an oil-soluble resin, the resin of the invention possessing advantageous properties not encountered in products of the same general class.

Oil-soluble phenolic resins are well known, and various methods have been suggested for the incorporation of oils, particularly China-wood, (tung) oil with phenolic resins. Tung oil, when properly incorporated in a phenolic resin, serves as an excellent plasticizer, but difficulties are encountered since the oil has a tendency to separate as the resinification proceeds, resulting in an undesirable non-homogeneous material. When the tung oil is properly incorporated so that no separation of the oil occurs during the curing of the resin, a very tough resilient product possessing high mechanical properties is obtained at the time the resin is prepared, but during use in the atmosphere particularly at high temperatures, there is a tendency for the product to lose the characteristic properties imparted to it by the tung oil, resulting in a brittle material.

Several methods have been suggested for the incorporation of tung oil with resin. The combination of a phenolic resin with rosin or other natural resins during the production of the phenolic resin was one of the first methods developed. These resins are of the non-heat-convertible type and, when incorporated with the tung oil, the composition may be used in the preparation of varnishes for coating applications. The varnishes have not been used successfully for impregnation purposes in the manufacture of laminated materials since, although the resin film is quite resistant to moisture, it loses its flexibility and strength on aging due to the deterioration of the oil caused by the oxidation thereof. Oxidation processes have also been employed, and these require the presence of an oxidizing accelerator such as lead manganese resinate during the combination of the resin and the oil. While these resins may be dissolved in a suitable solvent and used for impregnating purposes, the laminated product obtained has a marked tendency to become brittle with age. Other processes involve the addition of an acid, such as phosphoric acid, to a mixture of the phenol and the oil, and the subsequent continued heating of the mixture which causes hydrolysis of the oil, resulting in the liberation of the fatty acids therefrom which, in turn, react with the phenol forming the phenol-oil combination. Thereafter, this product is reacted with formaldehyde to form the resinous composition. A comparable reaction is obtained when phenol and oil are refluxed together for a long period of time (12 to 72 hours) with the subsequent reaction of the product with formaldehyde. The resulting resin appears to lack the toughness and flexibility desired, and high temperatures and long reaction times are required to bring about the combination of the phenol and the oil, even when an acid is also present. These resins also become brittle when subjected to heat for a long time, the heat, in the presence of air, destroying the characteristic properties of the tung oil which it is desired to impart to the resin.

One object of the present invention is to provide a phenolic resin having tung oil associated therewith in such a condition that the oxidation of the oil is prevented and separation of the oil from the resin does not take place either during the use of the resin in its initial, fusible, soluble stage, or during the conversion of the initial resin to the infusible, insoluble product.

Another object of the invention is to furnish a phenol-aldehyde-tung-oil resinous composition which may be successfully used as a coating material and which, in its infusible, insoluble stage will have high dielectric qualities, and high impact strength, high arc resistance and low moisture absorption.

Still another object of the invention is to provide a phenol-aldehyde-tung-oil resinous product particularly adapted for the impregnation of fibrous sheet material for use in the production of a laminated product characterized by its high mechanical properties and its tough, resilient nature, which properties are maintained under normal conditions of use.

A further object of the invention is to provide a resinous product of the type described which, when associated in laminated stock, makes available a material which can be easily fabricated into intricate parts, or punched, without the aid of heat.

Other objects, including a novel method of making the product of the invention, will be apparent from a consideration of the specification and claims.

The present invention contemplates the association with a phenolic resin, particularly a phenol-formaldehyde resin, of a reaction product of tung oil and an unsaturated, aliphatic, dicarboxylic acid. The compound may be associated with the resin by a number of precedures, as follows:

(a) The compound may be added to the resin in its initial soluble, fusible stage, since it is miscible therewith;

(b) The compound may be added to phenol or formaldehyde, or to a mixture of phenol and formaldehyde, and the resin may be sebsequently formed with the addition of any necessary ingredients; or (c) Tung oil and the acid may be added to phenol or formaldehyde, or to a mixture of phenol and formaldehyde, and the compound and resin may be subsequently formed with the addition of any necessary ingredients.

The unsaturated, aliphatic, dicarboxylic acid employed contains the

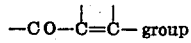
—CO—C=C— group and may be exemplified by maleic acid, or its anhydride, fumaric acid, citraconic acid, or its anhydride, or mesaconic acid. Since maleic acid is typical, the invention will be described using this acid in the examples. It is to be understood that the term "acid" employed herein includes the anhydrides of the acids since they act in the same manner as the acids. The amount of acid reacted with the tung oil may vary widely and may be as low as 2% since this amount changes the properties of the tung oil, rendering it soluble in a mixture of alcohol and benzol and rendering it completely miscible and reactive with phenol, and phenol-aldehyde resins. As the percentage of acid reacted with the tung-oil is increased, the compound becomes more resinous in character and, as this occurs, the drying properties of the tung-oil decrease. The upper limit of the amount of acid combined with the tung oil may be as high as 50%, or even higher, but, in general, the proportions used are between 4% and 20% of the acid based on the weight of the tung oil.

The phenol-aldehyde resin, with which the compound is associated, is preferably a product of the type manufactured by condensing about 1 mol of phenol with 1 mol of formaldehyde in the presence of a basic condensing agent, but other phenolic resins may be employed, if desired. Cresols and xylenols, or mixtures thereof, may be substituted for phenol, and hexamethylenetetramine, or other compounds possessing reactive methylene groups may be substituted for formaldehyde. The terms "phenol" and "formaldehyde", as employed herein, include the compounds of the type mentioned. The amount of tung-oil-acid compound present based on the weight of the phenol used is, in general, at least 40% to 50%, and the percentage may be increased upwardly as desired to 100%, or even more. As the amount of the compound in the resin is raised, the toughness and flexibility of the resulting resin increases and in any particular case the amount of acid combined with the tung oil and the amount of compound associated with the phenolic resin will be determined by the particular properties desired in the resin.

While the mechanism of the reaction involved in the formation of the tung-oil-acid compound is complex, it has been established that an addition product is obtained whether the reaction is carried out merely between the two components or whether it is conducted in the presence of phenol or formaldehyde, or in mixture of the two. It is thought, although the invention is not to be limited by this theory, that the reaction is of the diene type where one, or possibly more, of the double bonds of the glycerides of eleostearic acid of the tung oil and the double bond of the unsaturated aliphatic dicarboxylic acid react. The reaction between the phenol and the tung-oil-acid compound is also complex. If the compound is added to the initial resin after its formation, the reaction takes place in a comparable manner. In the claims, where it is stated that the compound is associated with "a phenol-formaldehyde resin prior to the conversion of the resin into an infusible, insoluble product", it is to be understood that the addition of the compound to the initial resin is included, as well as the addition of the compound, or the components thereof, to the reactants of the resin. The resin of the invention is designated as a phenol-formaldehyde-tung-oil resinous product, although it is to be understood that the presence of the tung-oil-acid compound markedly influences the properties of the resin. In the claims, phenol and formaldehyde are designated as primary components of the resin, and where it is stated that any necessary ingredients of the resin are to be added, it is to be understood that this contemplates the addition of phenol and/or formaldehyde in the necessary proportions to form the resin, if the compound of tung oil and acid is not associated with the phenol and formaldehyde in resin-making proportions.

The resin of the invention is heat convertible and differs in properties from the oil-soluble resins previously made, since the tung oil has not been broken down by hydrolysis but reacts in the form of its glyceride. The phenol resin is tough, hard and elastic, indicating that the characteristic properties of the tung oil have been retained. The resin does not become brittle with age due to oxidation, or lose its insulating qualities.

The resins, when dissolved in suitable solvents, are applicable for the impregnation of paper, fabric and asbestos for the manufacture of laminated material. Laminated material made by impregnating a high grade rag or alphapaper to a resin content of about 50% is very tough and flexible. The resin present in the laminated sheet is slightly thermo-plastic and will, therefore, soften under the influence of heat, rendering it possible to fabricate very intricate parts. The product has excellent insulating qualities and is very resistant to moisture. The material is particularly suitable for radio-frequency insulation where low dielectric-loss properties are essential.

Where it is desired to produce a resin of increased hardness, possessing especially high insulating properties, rosin, or other natural resin, may be added. This compound may be mixed with the compound of tung oil and dicarboxylic acid before or after it is mixed with the phenol and/or formaldehyde, or it may be mixed with the tung oil and dicarboxylic acid compound and the other constituents of the resin at any time before the reaction forming the initial resin. When rosin, or the like, is employed, it may be present in amounts from very small percentages, to 50% or more, based on the weight of the ingredients of the resin, but generally it is present in amounts between 10% and 30%.

When the tung-oil-acid compound is prepared prior to its addition to any of the other ingredients of the resin, the dicarboxylic acid may, if desired, be dissolved in water prior to its addition to the tung oil, but this step is unnecessary, since a reaction takes place between the dry acid and the tung oil on the heating of a mixture of the two compounds to a temperature between 110° C. and 177° C. In a typical case, 200 grams of tung oil and 4 grams of maleic anhydride are heated for one hour at 110° C. to 145° C.; a light yellowish slightly viscous liquid of oily characteristics is obtained. When the amount of maleic anhydride is increased to 20 grams and the conditions of the example followed, a light yellowish viscous liquid, resinous in character, is obtained. In the production of a compound containing 20% maleic anhydride, 200 grams of tung oil and 40 grams of maleic anhydride are mixed and heated to 100° C. Considerable frothing occurs, which ceases at about 145° C. The reacting mixture is heated for 2 hours at 110° C. to 145° C., and the resulting product when cool is a resinous, very viscous, sticky mass of a light transparent color.

The following methods are illustrative of the methods which may be employed in the manufacture of the resin:

Example I

Heat 600 gms. of tung oil and 24 gms. of maleic acid (24 gms. of maleic acid dissolved in 50 gms. of water) in a beaker provided with a stirrer for 45 minutes at a temperature of 145 to 177° C. After 45 minutes, the oil is converted into a heavy viscous resinous material. Transfer the oil composition into a flask provided with a reflux condenser. Add 1200 gms. of cresylic acid, and heat the mixture for 45 minutes at 150° C. Allow the mixture to cool down to a temperature below 100° C. and add 1200 gms. of U. S. P. formaldehyde and 8.4 gms. of ammonia (28-29%). Reflux from 28 to 45 minutes and then distill under vacuum until the resin is substantially free from water. The resulting resin is a viscous golden-amber colored syrup. The resin may be dissolved in a suitable solvent and used as an impregnating varnish, for example, it may be dissolved in alcohol (610 gms.) and benzol (285 gms.) to produce a varnish.

Example II

Heat 600 gms. of tung oil and 24 gms. of maleic acid (24 gms. dissolved in 50 gms. of water) in a beaker provided with a stirrer for 30 to 60 minutes at a temperature of 145 to 177° C. Transfer the oil composition to a flask provided with a reflux condenser and cool down to 100° C. Add 1200 gms. of cresylic acid, 1200 gms. of formaldehyde U. S. P. and 8.4 gms. of ammonia (28-29%). Reflux from ½ to 1 hour and then distill under vacuum until the resin is substantially free from water. The resulting resin is a viscous golden-amber colored syrup which is soluble in a mixture of alcohol and benzol (610 gms. of alcohol and 285 gms. of benzol).

Example III

Heat 750 gms. of tung oil, 30 gms. of maleic acid (dissolved in about 65 gms. of water) and 1200 gms. of cresylic acid in a flask provided with a reflux condenser for 25 minutes to 2 hours at a temperature of 145 to 165° C. The resulting compound is a syrupy reddish-brown liquid possessing definite resinous properties. The viscosity of the composition depends on the length of the refluxing time. The product represents a reaction product between the oil composition and the phenol. The composition is cooled to a temperature below 90° C., and 1200 gms. of formaldehyde (U. S. P.) and 8.4 gms. ammonia (28-29%) are added. The materials are refluxed for ½ to 1½ hours and then subjected to distillation under vacuum until substantially all of the water has been removed. The resulting resin is a reddish-brown colored syrup which is soluble in a mixture of alcohol and benzol (alcohol 520 parts; benzol 250 parts).

Example IV

A mixture of 600 gms. of tung oil and 60 gms. of maleic acid are heated from 1 to 3 hours at a temperature of 110° C. to 170° C.; a light yellowish, viscous, resinous liquid results. A phenol-formaldehyde resin is made by reacting in a reflux apparatus 1200 gms. of cresylic acid, 1200 gms. of formaldehyde (U. S. P.), and 8.4 gms. of ammonia (28-29%) for ½ to 1 hour. The water is removed by distillation under vacuum. The oil composition is then added, with constant stirring, to the resin and stirring continued until a uniform product results. The resulting product is a light amber-colored, transparent, viscous liquid. A sample of the resin, when allowed to stand at room temperature, remains clear and transparent. A sample of the resin placed in an oven at 125° C. for 1 hour forms a reddish-yellow colored transparent film. There is no tendency for the tung oil to separate. The resin may be dissolved in a mixture of alcohol and benzol (alcohol—520 parts; benzol 250 parts). Further heating at a temperature between 90° and 125° C. is sometimes desirable to increase the viscosity and body of the resin.

Example V

Heat 1000 gms. of tung oil and 100 gms. of maleic acid (40 gms. maleic acid dissolved in about 100 gms. of water) in a beaker provided with a stirrer for ½ to 1 hour at a temperature of 145 to 177° C. Transfer the oil composition to a flask provided with a reflux condenser. Add 500 gms. of rosin (colophony) and 1200 gms. of cresylic acid and heat the mixture under a reflux for ½ to 4 hours. Allow the mixture to cool down to a temperature below 100° C. and add 1200 gms. of formaldehyde (U. S. P.) and 9 gms. of ammonia (28-29%). Reflux from ½ to 2 hours and then distill under vacuum until the resin is substantially free from water. The resin may be dissolved in a suitable solvent (alcohol and benzol) and used as a coating or impregnating varnish.

Considerable modification is possible in the amount of unsaturated aliphatic dicarboxylic acid reacted with the tung oil, and the amount of tung-oil-acid compound associated with the resin, as well as in the steps of making the resin of the invention without departing from the essential features of the invention.

I claim:

1. The steps in the method of making a heat-convertible phenol-formaldehyde resin of the oil-soluble type which comprises adding a reaction product of a double bond of tung oil and the double bond of an unsaturated, aliphatic, dicarboxylic acid having a

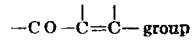

to at least one of the primary reactants of an oil-incompatible, heat-convertible phenol-formaldehyde resin, adding any other reactants necessary to form the resin, and reacting the components to form a potentially reactive oil-soluble resin.

2. The steps in the method of making a heat-convertible phenol-formaldehyde resin of the oil-soluble type which comprises adding tung oil and an unsaturated, aliphatic, dicarboxylic acid having a $$-CO-\overset{|}{C}=\overset{|}{C}-\text{ group}$$

to at least one of the primary reactants of an oil-incompatible, heat-convertible phenol-formaldehyde resin, adding any other reactants necessary to form said resin, and reacting the components to form a potentially reactive resin, rendered oil-soluble by a reaction product of a double bond of the tung oil and the double bond of the unsaturated, aliphatic, dicarboxylic acid.

3. A tung oil-phenol-formaldehyde resin capable of being converted by heat into an infusible, insoluble product comprising the reaction product of an oil-incompatible, heat-convertible, phenol-formaldehyde resin with a reaction product of a double bond of tung oil and a double bond of an unsaturated, aliphatic, dicarboxylic acid having a $$-CO-\overset{|}{C}=\overset{|}{C}-\text{ group}$$

there being present at the time of the conversion of said oil-incompatible resin into said tung oil-phenol-formaldehyde resin only said oil-incompatible resin and said tung oil-dicarboxylic acid reaction product as substantial reactants, said tung oil-phenol-formaldehyde resin yielding no separation of the oil during curing of the resin.

4. The product of claim 3 wherein the unsaturated, aliphatic, dicarboxylic acid is maleic acid.

5. The product of claim 3 wherein the unsaturated, aliphatic, dicarboxylic acid is present in said tung oil reaction product between about 2% and 50% based on the weight of the tung oil.

6. The product of claim 3 wherein the unsaturated, aliphatic, dicarboxylic acid is maleic acid and is present in said tung oil reaction product between 2% and 50% based on the weight of the tung oil.

7. The product of claim 3 wherein the unsaturated, aliphatic, dicarboxylic acid is present in said tung oil reaction product between about 2% and 50% based on the weight of the tung oil and wherein the amount of tung oil-dicarboxylic acid reaction product in said tung oil-phenol-formaldehyde resin is not more than 100% based on the phenol content thereof.

8. The product of claim 3 wherein the unsaturated, aliphatic, dicarboxylic acid is maleic acid and is present in said tung oil reaction product between about 4% and 20% based on the weight of the tung oil and wherein the amount of tung oil-dicarboxylic acid reaction product in said tung oil-phenol formaldehyde resin is from about 40% to 100% based on the phenol content thereof.

9. The product of claim 3 wherein the unsaturated, aliphatic, dicarboxylic acid is maleic acid and is present in said tung oil reaction product between about 4% and 20% based on the weight of the tung oil and wherein the phenol and formaldehyde in said heat convertible phenol-formaldehyde resin are present in the neighborhood of equimolecular proportions and wherein the amount of tung oil-dicarboxylic acid reaction product in said tung oil-phenol-formaldehyde resin is from about 40% to 100% based on the phenol content thereof.

10. The step in the method of making a tung oil-phenol-formaldehyde resin capable of being converted by heat into an infusible, insoluble product without yielding a separation of the oil therefrom which comprises reacting an oil-incompatible, heat-convertible, phenol-formaldehyde resin with a reaction product of a double bond of tung oil and a double bond of an unsaturated, aliphatic, dicarboxylic acid having a $$-CO-\overset{|}{C}=\overset{|}{C}-\text{ group}$$

there being present at the time of the conversion of said oil-incompatible resin into said tung oil-phenol-formaldehyde resin only said oil-incompatible resin and said tung oil-dicarboxylic acid reaction product as substantial reactants.

11. The method of making a tung oil-phenol-formaldehyde resin capable of being converted by heat into an infusible, insoluble product without yielding a separation of the oil therefrom which comprises adding, to an oil-incompatible, heat-convertible phenol-formaldehyde resin, a reaction product of a double bond of tung oil and a double bond of an unsaturated, aliphatic, dicarboxylic acid having a $$-CO-\overset{|}{C}=\overset{|}{C}-\text{ group}$$

and reacting said resin and said reaction product to form said tung oil-phenol-formaldehyde resin, there being present at the time of the conversion of said oil-incompatible resin into said tung oil-phenol-formaldehyde resin only said oil-incompatible resin and said tung oil-dicarboxylic acid reaction product as substantial reactants.

12. The method of making a tung oil-phenol-formaldehyde resin capable of being converted by heat into an infusible, insoluble product without yielding a separation of the oil therefrom which comprises adding, to at least one of the primary reactants of an oil-incompatible, heat-convertible, phenol-formaldehyde resin, a reaction product of a double bond of tung oil and a double bond of an unsaturated, aliphatic, dicarboxylic acid having a $$-CO-\overset{|}{C}=\overset{|}{C}-\text{ group}$$

adding thereto any other reactant necessary to form said resin, and reacting said mixture to form said tung oil-phenol-formaldehyde resin, there being present at the time of the conversion of said oil-incompatible resin into said tung oil-phenol-formaldehyde resin only the said oil-incompatible resin and the said tung oil-dicarboxylic acid reaction product as substantial reactants.

13. The method of making a tung oil-phenol-formaldehyde resin capable of being converted by heat into an infusible, insoluble product without yielding a separation of the oil therefrom which comprises adding, to at least one of the primary reactants of an oil-incompatible, heat-convertible, phenol-formaldehyde resin, tung oil and an unsaturated, aliphatic, dicarboxylic acid having a $$-CO-\overset{|}{C}=\overset{|}{C}-\text{ group}$$

adding any other reactant necessary to form said resin, and reacting said mixture to form said tung oil-phenol-formaldehyde resin, there being present at the time of the conversion of said oil-incompatible resin into said tung oil-phenol-formaldehyde resin only said oil-incompatible resin and a tung oil-dicarboxylic acid reaction product as substantial reactants.

ARTHUR HAROLDSON.